(12) United States Patent
Bertrand et al.

(10) Patent No.: US 12,497,057 B2
(45) Date of Patent: Dec. 16, 2025

(54) DEVICE AND METHOD FOR COMPUTING DRIVING PARAMETERS

(71) Applicants: RENAULT S.A.S, Boulogne Billancourt (FR); NISSAN MOTOR CO., LTD., Kanagawa-ku (JP)

(72) Inventors: Patrice Bertrand, Toulouse (FR); Eric Perraud, Toulouse (FR)

(73) Assignees: AMPERE S.A.S., Boulogne Billancourt (FR); NISSAN MOTOR CO., LTD., Kanagawa-ku (JP)

( * ) Notice: Subject to any disclaimer, the term of this patent is extended or adjusted under 35 U.S.C. 154(b) by 190 days.

(21) Appl. No.: 18/260,718

(22) PCT Filed: Jan. 6, 2022

(86) PCT No.: PCT/EP2022/050206
§ 371 (c)(1),
(2) Date: Jul. 7, 2023

(87) PCT Pub. No.: WO2022/148812
PCT Pub. Date: Jul. 14, 2022

(65) Prior Publication Data
US 2024/0059301 A1 Feb. 22, 2024

(30) Foreign Application Priority Data
Jan. 8, 2021 (FR) ..................................... 21 00170

(51) Int. Cl.
*B60W 50/023* (2012.01)
*G06F 11/14* (2006.01)

(52) U.S. Cl.
CPC ....... *B60W 50/023* (2013.01); *G06F 11/1497* (2013.01); *G06F 2201/805* (2013.01)

(58) Field of Classification Search
CPC ........... B60W 50/023; B60W 2050/021; G06F 11/1497; G06F 2201/805; G06F 11/1004;
(Continued)

(56) References Cited

U.S. PATENT DOCUMENTS 11,214,273 B2 * 1/2022 Yousuf ................ B60W 50/045
12,174,695 B2 * 12/2024 Heyl .................... G06F 11/0709
(Continued)

FOREIGN PATENT DOCUMENTS

EP           3 663 920 A1      6/2020

OTHER PUBLICATIONS

International Search Report issued Mar. 28, 2022 in PCT/EP2022/050206, filed on Jan. 6, 2022, 2 pages.
(Continued)

*Primary Examiner* — Kamini B Patel
(74) *Attorney, Agent, or Firm* — Oblon, McClelland, Maier & Neustadt, L.L.P.

(57) ABSTRACT

A computing device includes a first unit and a second unit. In response to receipt of a request corresponding to a computing function, the first unit may: determine an execution context; trigger a first execution of the function on the second unit, this delivering a first comparison parameter, a first temporal execution parameter being associated with the first comparison parameter; trigger a second execution of the function on the second unit, this delivering a second comparison parameter, a second temporal execution parameter being associated with the second comparison parameter; compare the first and second comparison parameters, a temporal comparison parameter being associated with the result of the comparison; and determine a computing status.

17 Claims, 3 Drawing Sheets

(58) Field of Classification Search
CPC ............. G06F 11/1637; G06F 11/1641; G06F 11/1645
See application file for complete search history.

(56) References Cited

U.S. PATENT DOCUMENTS

| | | | |
|---|---|---|---|
| 2017/0091051 A1* | 3/2017 | Liisberg | .............. G06F 11/1658 |
| 2020/0017114 A1* | 1/2020 | Santoni | ............. B60W 50/0205 |
| 2020/0174829 A1 | 6/2020 | Shao et al. | |
| 2021/0072407 A1* | 3/2021 | Talbot | ..................... G01S 19/44 |
| 2021/0263779 A1* | 8/2021 | Haghighat | ............ G06F 9/5061 |
| 2022/0012112 A1* | 1/2022 | Wouhaybi | ........... G06F 11/3447 |
| 2025/0004890 A1* | 1/2025 | Diziol | ................... G06F 11/263 |

OTHER PUBLICATIONS

French Preliminary Search Report issued Sep. 14, 2021 in FR 21 00170, filed on Jan. 8, 2021, 3 pages (with English Translation of Categories of Cited Documents).

* cited by examiner

DEVICE AND METHOD FOR COMPUTING DRIVING PARAMETERS

PRIOR ART

The invention generally relates to computing systems, and in particular to a device and method for computing driving parameters, the device and method being intended to be employed on board a vehicle.

In the automotive field, major developments have been made in recent years in the context of vehicle automation. Automated or semi-automated vehicles incorporate control systems for driving the vehicle and/or ensuring its safety, such as advanced driver assistance systems (ADAS), adaptive cruise control, collision avoidance systems, etc. Implementation of the control applications used by such control systems generally requires deployment, in the vehicle, of a plurality of sensors for perceiving the environment, and of one or more computers executing algorithms that are increasingly demanding in terms of computing power and in terms of level of dependability (LoD). In the automotive field, LoD is mainly regulated by the standard ISO 26262, which requires suppliers of integrated circuits to comply with design rules guaranteeing the quality of their computers. The standard ISO 26262 also applies to manufacturers who incorporate these integrated circuits into their vehicles, requiring them to ensure that errors liable to occur in a computer during execution of a given algorithm are controllable. Such errors may be systematic in nature or random in nature.

It is known to use development methods and intensive test campaigns to treat systematic errors. Such approaches are generally incompatible with treatment of random errors, which may correspond to inversion of a bit during a read from or a write to a register or memory, or during execution of an instruction of a given algorithm. Random errors may for example be induced by photonic or electromagnetic interference the source of which is the external environment. The probability of occurrence of these random errors increases in very high-performance processors developed in semiconductor technologies employing line widths of a few nanometers.

One known solution for treating random errors liable to affect a computer consists in duplicating the employed hardware resources (processors, memories, inter alia), and in executing all the instructions of an algorithm in a redundant manner in order then to compare the obtained results in order to identify potential differences, representative of the appearance of a random error. Such a solution is called "hardware lockstep". The hardware-lockstep solution is particularly effective in applications with a low computing speed and would be suitable for complex algorithms requiring a high computing speed such as those required in vehicles. However, the hardware-lockstep solution used with such complex algorithms is not commercially available and is very expensive.

There is therefore a need for an improved computing device and method capable of treating random errors that may occur during execution of an algorithm without the need to duplicate all the hardware resources employed.

GENERAL DEFINITION OF THE INVENTION

To this end, the present invention provides a device for computing driving parameters that is intended to be located on board a vehicle, the device comprising:

a first computing unit, associated with a given computing power and a given integrity level; and a second computing unit, comprising one or more computers, the second computing unit being associated with a computing power greater than the computing power associated with the first computing unit and with an integrity level lower than the integrity level associated with the first computing unit, the second computing unit being configured to execute one or more computation functions, this delivering, for each computation function, an output comprising a computation result and a comparison parameter representative of the computation result.

Advantageously, in response to receipt of a request for computation of a driving parameter, the computation request corresponding to a given computation function, the first computing unit may be configured to:

determine an execution context of the given computation function on the second computing unit;

trigger a first execution, called the nominal execution, of the given computation function, in the determined execution context, on the second computing unit, this delivering a first output comprising a first result of computation of the driving parameter and a first comparison parameter, a first execution time parameter being associated with the first comparison parameter;

trigger a second execution, called the redundant execution, of the given computation function, in the determined execution context, on the second computing unit, this delivering a second output comprising a second result of computation of the driving parameter and a second comparison parameter, a second execution time parameter being associated with the second comparison parameter;

compare the first comparison parameter and the second comparison parameter, a comparison time parameter being associated with the result of the comparison;

determine a computation status of the driving parameter as a function of a condition depending on the result of the comparison and as a function of the time parameters, the computation status being positive if the two comparison parameters are identical and the time parameters are valid.

In one embodiment, a time parameter may be valid if it is lower than a corresponding threshold.

In another embodiment, the comparison parameter may be obtained from the corresponding computation result by applying a hash function.

Advantageously, the nominal execution and the redundant execution may be carried out sequentially over time, the second computing unit comprising one or more computers.

As a variant, the nominal execution and the redundant execution may be carried out on the same computer of the second computing unit.

In one embodiment, the nominal execution and the redundant execution may be carried out in parallel over time on two separate computers of the second computing unit.

In another embodiment, the computation request may be sent by a sending device and the computing device may further be configured to transmit, to the sending device, via the first computing unit, the first computation result and a notification of a positive computation status, if the computation status is positive.

Optionally, the computation request may be sent by a sending device and the computing device may further be configured to transmit, to the sending device, via the first computing unit, a computation divergence notification, if the computation status is negative.

Advantageously, the first computing unit may be configured to implement a plurality of iterations until the computation status is positive.

As a variant, the first computing unit may further be configured to verify the integrity of the received computation request.

In one embodiment, the execution context may be defined by the first computing unit as a function of a flow of raw data transmitted directly from an external sensor to the second computing unit.

In another embodiment, the integrity level of the first computing unit may be ensured by means of a hardware redundancy technique.

Advantageously, the execution context may comprise a plurality of input variables, a plurality of random numbers and time information.

A method for computing driving parameters that is intended to be implemented in a computing device located on board a vehicle is further provided, the computing device comprising:
- a first computing unit, associated with a given computing power and a given integrity level; and
- a second computing unit, comprising one or more computers, the second computing unit being associated with a computing power greater than the computing power associated with the first computing unit and with an integrity level lower than the integrity level associated with the first computing unit, the second computing unit being configured to execute one or more computation functions, this delivering, for each computation function, an output comprising a computation result and a comparison parameter representative of the computation result.

Advantageously, the method comprises, in response to receipt of a request for computation of a driving parameter, the computation request corresponding to a given computation function, the following steps implemented by the first computing unit and consisting in:
- determining a context of execution of the given computation function on the second computing unit;
- triggering a first execution, called the nominal execution, of the given computation function, in the determined execution context, on the second computing unit, this delivering a first output comprising a first result of computation of the driving parameter and a first comparison parameter, a first execution time parameter being associated with the first comparison parameter;
- triggering a second execution, called the redundant execution, of the given computation function, in the determined execution context, on the second computing unit, this delivering a second output comprising a second result of computation of the driving parameter and a second comparison parameter, a second execution time parameter being associated with the second comparison parameter;
- comparing the first comparison parameter and the second comparison parameter, a comparison time parameter being associated with the result of the comparison;
- determining a computation status of the driving parameter as a function of a condition depending on the result of the comparison and as a function of the time parameters, the computation status being positive if the two comparison parameters are identical and the time parameters are valid.

BRIEF DESCRIPTION OF THE FIGURES

Other features and advantages of the invention will become apparent with the aid of the following description and of the figures, in which.

DETAILED DESCRIPTION

Figure 1:
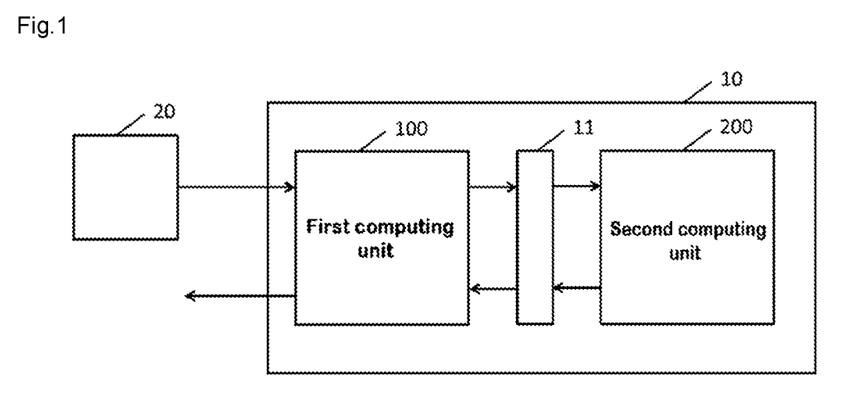
FIG. 1 shows the general architecture of a device for computing driving parameters, according to one embodiment of the invention.

FIG. 1 shows a general architecture of a device 10 for computing driving parameters, according to one embodiment of the invention. The computing device comprises a first computing unit 100 and a second computing unit 200. The two computing units 100, 200 are configured to exchange digital data via a communication unit 11 that is able to ensure reliable communications between the two computing units 100, 200. Each of the two computing units 100, 200 may comprise one or more computers capable of executing instructions representing a program representative of a coordination function or of a computation function, and memory resources capable of saving, in a volatile or permanent manner, data associated with such instructions. Advantageously, each of the two computing units 100, 200 may be associated with performance metrics comprising a computing power and an integrity level.

The computing power of a computing unit may for example be defined in terms of computing speed, i.e. in terms of the number of instructions per second that the computing unit is able to execute. In the remainder of the description, the computing power of the first computing unit 100 is chosen to be lower, for example by a factor of 10, than the computing power of the second computing unit 200.

Moreover, the integrity level of a computing unit may, for example, quantify the degree of confidence associated with the computation results delivered. Specifically, a computation result delivered by a computing unit may be corrupted following systematic and/or random errors generated by the computing unit. Furthermore, a predefined integrity threshold may advantageously be used so that a computing unit may be classified in the "guaranteed level of dependability (LoD)" category if the associated integrity level is higher than the predefined integrity threshold. In the remainder of the description, the integrity level of the first computing unit 100 is chosen to be higher than the integrity level of the second computing unit 200 and than the predefined integrity threshold, the LoD thus being ensured in the first computing unit 100.

In one embodiment of the invention, the LoD of the first computing unit 100 may be ensured by means of a hardware redundancy technique, also known as "hardware lockstep", that consists in duplicating hardware resources (processors and memory resources) and in redundantly executing the implemented software resources. In this case, the LoD is ensured via redundant execution, in parallel or sequentially over time, of all the instructions of a program and via comparison of the obtained results in order to detect potential errors, an error being detected when the two obtained results are not identical. Advantageously, the first computing unit 100 may be used to execute functions requiring a high integrity level.

In another embodiment, the LoD of the second computing unit 200 may not be guaranteed, i.e. the integrity level associated with the second computing unit 200 may be lower than the predefined integrity threshold. In this case, hardware resources implemented in the second computing unit 200 need not be duplicated. For example, the second computing unit 200 may comprise a single computer. Advantageously, the second computing unit 200 may be used to execute functions requiring a high computing power.

The computing device 10 may receive and process driving-parameter computation requests generated by external sending devices 20. Examples of computation requests comprise, by way of example, computing a route to follow, determining an optimal driving speed and identifying objects that could cause a collision. Generally, the processing of a computation request involves execution of one or more coordination functions requiring a high integrity level and execution of one or more computation functions requiring high computing power.

In embodiments of the invention, the first computing unit 100 is configured to execute coordination functions associated with processing of a computation request. Examples of coordination functions for example comprise verification of the integrity of the received computation request, determination of an execution context of the computation function associated with the computation request and receipt of the computation result generated by executing the computation function. Furthermore, the second computing unit 200 may be configured to execute computation functions that use a computing power higher than that required by the coordination functions.

In other embodiments of the invention, the first computing unit 100 may further be configured to control execution of each computation function on the second computing unit 200. For example, the first computing unit 100 may determine an execution context of a computation function on the second computing unit 200. According to embodiments of the invention, the first computing unit 100 may further trigger first and second executions of the same computation function on the second computing unit 200, the first and second executions being carried out in the same execution context. In this case, the first computing unit 100 may then receive and compare the computation results generated by the first and second executions of the same computation function.

In one embodiment of the invention, the device 10 for computing driving parameters may receive and process driving-parameter computation requests of "request/response" type requiring execution of one or more coordination functions on the first computing unit 100 and execution of a computation function on the second computing unit 200. In this case, the first computing unit 100 may trigger first and second executions of the computation function, in the same execution context, on the second computing unit 200. Furthermore, the device 10 for computing driving parameters may transmit, to the device 20 that sent the computation request, the computation result of the computation function and a notification, if no computation error is detected, as will be detailed later in the description.

In another embodiment of the invention, the device 10 for computing driving parameters may receive and process driving-parameter computation requests of "asynchronous or periodic event" type. Such computation requests may be processed in a similar manner to a computation request of "request/response" type, without transmitting the computation result of the executed computation function to the sending device 20, if a computation is detected, as will be detailed later in the description.

In embodiments of the invention, the hardware resources implemented in the second computing unit 200 are not duplicated. In this case, the first execution of a computation function, also called the nominal execution, and the second execution of the same computation function, also called the redundant execution, are performed on the second computing unit 200 sequentially over time in the same execution context determined beforehand by the first computing unit 100. The first computing unit 100 is configured to receive and compare the computation results generated by the first and second executions of the computation function.

In other embodiments of the invention, the hardware resources, processors, memory resources, inter alia, implemented in the second computing unit 200 may be duplicated so as to achieve the nominal execution and the redundant execution of a given computation function simultaneously, in the same execution context determined beforehand by the first computing unit 100. In such embodiments, the first computing unit 100 also receives and compares the computation results generated by the first and second executions of the computation function.

Advantageously, the second computing unit 200 may apply a hash function to the computation result generated by each executed computation function, the output of the hash function forming a comparison parameter representative of the computation result. Generally, any method allowing a comparison parameter to be obtained from a computation result may be implemented by the second computing unit 200. In this case, the first computing unit 100 receives and compares the comparison parameters, instead of receiving and comparing the computation results. This makes it possible to significantly reduce the volume of data exchanged between the first and second computing units 100, 200. The hash function implemented in the second computing unit 200 may, by way of non-limiting example, belong to the SHA family (SHA being the acronym of Secure Hash Algorithm). In the case of a computation request of "request/response" type, the first computing unit 100 may further receive the computation result associated with the nominal execution of the computation function when the two comparison parameters are valid and identical. Those skilled in the art will understand that in cases where a hash function is not used, the comparison parameter corresponds to the computation result of the associated computation function.

As a variant, the first computing unit 100 may be configured to compute an execution time parameter in relation to each execution of a computation function, the execution being able to be nominal or redundant. Such an execution time parameter may measure the time interval separating the trigger of execution of the computation function and the receipt of the comparison parameter by the first computing unit 100. The first computing unit 100 may further be configured to compute a comparison time parameter in relation to each computation function executed on the second computing unit 200. Such a comparison time parameter may be the time interval separating the trigger of the nominal execution of the computation function and the determination of the result of comparison of the two comparison parameters.

In embodiments of the invention, an execution time threshold may be defined and used by the first computing unit 100 in order to validate or invalidate a comparison parameter representative of the computation result of a computation function. For example, a comparison parameter may be validated by the first computing unit 100 if the associated execution time parameter is less than the execution time threshold, i.e. if the comparison parameter is received with a delay less than the execution time threshold. Advantageously, the comparison parameter associated with a nominal execution of a computation function may be validated before the comparison with the comparison parameter associated with the redundant execution of the same computation function. A computation error may be determined by the first computing unit 100 when at least one comparison parameter is invalid, even in the case where the two comparison parameters are identical.

In other embodiments of the invention, a comparison time threshold may be defined and used by the first computing unit 100 in order to validate or invalidate a result of comparison of two comparison parameters associated with a nominal execution and with a redundant execution of the same computation function. Furthermore, the comparison time threshold may differ depending on whether the nominal execution and the redundant execution are carried out sequentially or in parallel over time. For example, a comparison result may be validated by the first computing unit 100 if the associated comparison time parameter is less than the comparison time threshold. A computation error may be determined by the first computing unit 100 when the comparison result is invalidated, even in the case where the two comparison parameters are valid and identical.

Advantageously, the first computing unit 100 may be configured to detect a computation error when at least one of the following three conditions, mentioned by way of non-limiting example, is detected:
  at least one of the comparison parameters is invalidated;
  the comparison result is invalidated;
  at least two comparison parameters are not identical.

Advantageously, the first computing unit 100 may be configured to determine a computation status, which may be positive in the absence of computation errors. Thus, the embodiments of the invention provide a device 10 for computing driving parameters that is capable of executing computation functions using a high computing power on a second computing unit 200 the level of dependability of which is not guaranteed, while being capable of detecting random errors liable to occur during execution of the computation function, for example.

Figure 2:
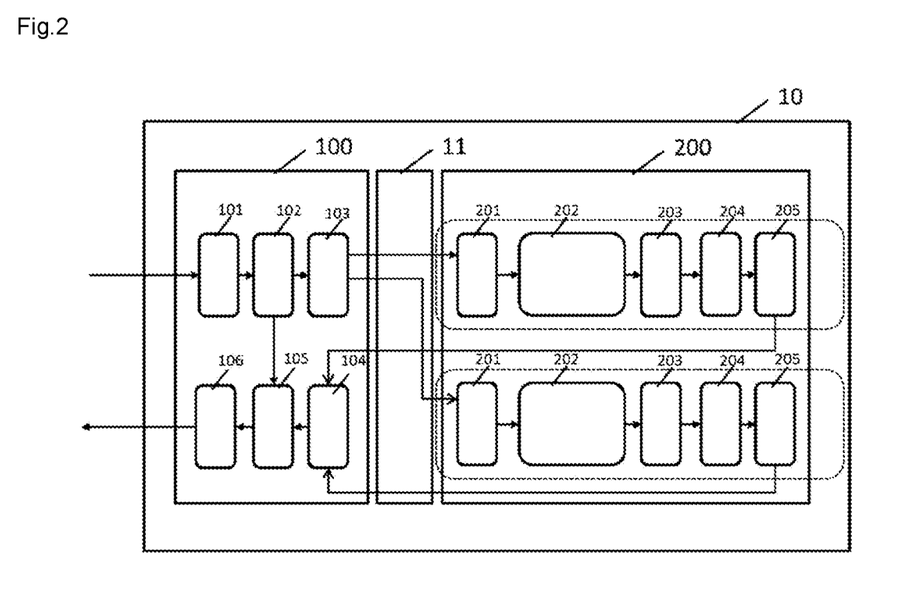
FIG. 2 shows a detailed architecture of a device for computing driving parameters, according to one embodiment of the invention.

FIG. 2 shows the architecture of a device 10 for computing driving parameters according to one embodiment of the invention. The first computing unit 100 comprises a set of processing modules 101, 102, 103, 104, 105, 106, each processing module being configured to implement a specific coordination function used in the processing of a received computation request. The processing modules belonging to the first computing unit 100 have the same characteristics in terms of computing power and of level of dependability as the first computing unit 100. Generally, the processing modules use the same hardware and/or software resources as the computing unit to which they belong. In particular, the level of dependability of each processing module belonging to the first computing unit 100 may be guaranteed by means of a hardware redundancy technique.

The first computing unit 100 may comprise a first processing module 101 configured to verify the integrity of a computation request received by the device 10 for computing driving parameters from an external sending device 20. Integrity may be verified by the first processing module 101 in a collaborative manner with the external sending device 20 by means of a given hashing algorithm that may belong to the SHA family. In this case, the external sending device 20 may be configured to compute a checksum, also called a "signature" or "fingerprint", by applying the hashing algorithm to the computation request. The external sending device 20 may further send, simultaneously or sequentially over time, the computation request and the associated checksum. In this case, the first processing module 101 may be configured to apply the same hashing algorithm to the received computation request before comparing the computed checksum with the one transmitted by the external sending device 20. If the two checksums are identical, the first processing module 101 may transmit the computation request to another processing module with a view to processing the computation request.

Advantageously, the first computing unit 100 may comprise a second processing module 102 able to receive a computation request the integrity of which has been verified beforehand, in order to determine an execution context of the computation function associated with processing of the received computation request, the computation function being executed on the second computing unit 200. Determination of an execution context by the second processing module 102 may consist in determining all the input parameters required in the execution of the computation function. Examples of input parameters may comprise, by way of illustration, values of fixed quantities involved in mathematical equations implemented by the computation function, random numbers, time information such as the time at which the nominal execution was triggered, input variables, etc. More generally, determination of a computation context consists in defining all the input parameters liable to affect the computation result, in the absence of random computation errors. Furthermore, the second processing module 102 may be configured to trigger execution of the computation function on the second computing unit 200. For example, the second processing module 102 may simultaneously trigger the nominal execution and the redundant execution of the computation function.

The determined computation context may be received by a third processing module 103 belonging to the first computing unit 100 and configured to communicate with the second computing unit 200. Such communication may be encrypted or unencrypted and may be carried out by means of a communication medium providing a high throughput, for example of the order of several Gb/s, and a low latency, for example lower than one microsecond.

The first computing unit 100 may further comprise a fourth processing module 104 able to receive computation results and/or comparison parameters representative of the computation results delivered by the second computing unit 200. Such computation results and/or comparison parameters may then be received and processed by a fifth processing module 105. The fifth processing module 105 may be configured to detect computation errors by comparing the comparison parameters and by monitoring the associated execution and comparison time parameters. In the absence of computation errors (positive computation status) in relation to a computation request of "request/response" type processed by the computing device, the fifth processing module 105 may further be configured to format the associated computation result with a notification of a positive computation status. Advantageously, a sixth processing module 106 may be implemented in the first computing unit 100 and may be configured to receive the computation result and the notification of a positive computation status, or to receive a notification of computation divergence, i.e. a notification of a negative computation status, with a view to creating a response to the processed computation request. Optionally, the sixth computing unit may be configured to compute a checksum using a hashing algorithm such as the one used by the external sending device 20.

Similarly to the first computing unit 100, the second computing unit 200 may comprise a plurality of computing modules 201, 202, 203, 204, 205 used to execute a computation function. The level of dependability of the computing modules forming the second computing unit 200 may not be guaranteed. Moreover, the computing modules implemented in the second computing unit 200 need not be duplicated. In this case, the nominal execution and the redundant execution of a computation function are carried out sequentially over time on the same computer, a computer according to the embodiments of the invention designating a set of interconnected computing modules. Alternatively, the computing modules forming the second computing unit 200 may be duplicated so as to allow a nominal execution and a redundant execution of a computation function in parallel over time on two separate computers. The following description of certain embodiments will mainly be given in relation to the computing modules forming a computer implemented in the second computing unit 200.

The second computing unit 200 may comprise a first computing module 201 able to communicate with the first computing unit 100 so as to receive, in relation to a computation request involving execution of a computation function, an execution context, a first order to trigger a nominal execution of the computation function and a second order to trigger a redundant execution of the same computation function.

The second computing unit 200 may further comprise a second computing module 202 configured to execute, in the determined execution context, the computation function associated with the computation request in the course of being processed by the device 10 for computing driving parameters. Execution of a computation function in an execution context delivers a computation result. In the example of a request for computation of an optimal route to follow, the computation result may comprise all of the road sections forming the computed optimal route.

Furthermore, the second computing unit 200 may comprise a third computing module 203 and a fourth computing module 204 configured to receive the computation result generated by execution of a computation function, and to save, in a volatile memory, i.e. temporarily, the received computation result, respectively.

Advantageously, the second computing unit 200 may further comprise a fifth computing module 205 able to receive the computation result and to apply to the received computation result a given hash function, this delivering a comparison parameter representative of the computation result that is more compact, and therefore that is faster to send back to the processing module 104 and more able to be processed by the processing module 105.

Figure 3:
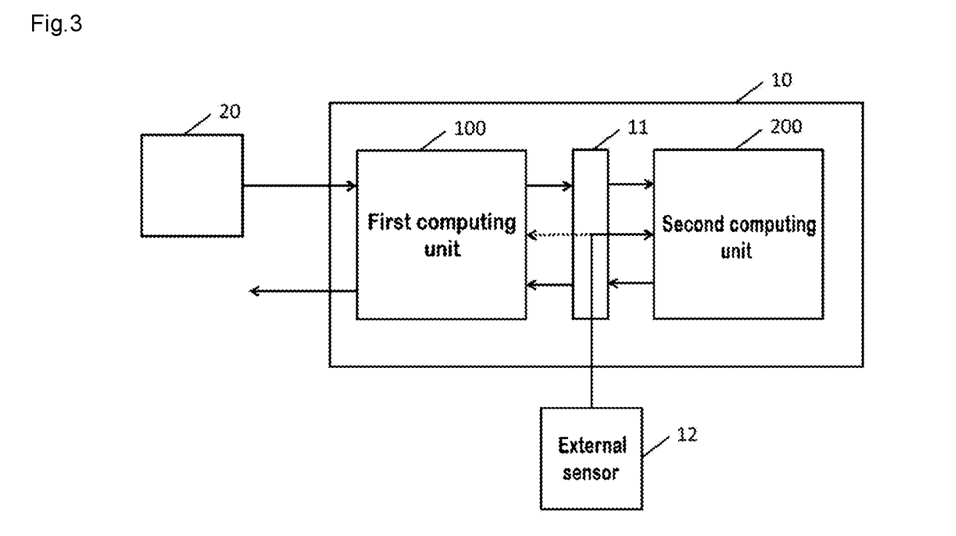
FIG. 3 shows another architecture of a device for computing driving parameters, according to another embodiment of the invention.

FIG. 3 shows an architecture of a device 10 for computing driving parameters according to another embodiment of the invention. In such an embodiment, the computing device is connected to an external sensor 12 that delivers a flow of raw data required to process one or more computation requests received by the device 10 for computing driving parameters. The external sensor 12 may for example be a camera located on board a vehicle. In this case, in response to receipt of a computation request for which execution of the corresponding computation function uses such a flow of raw data, the second computing unit 200 may be configured to receive the flow of raw data delivered by the external sensor 12 directly, i.e. the flow of raw data does not pass through the first computing unit 100. Furthermore, the first computing unit 100 may be configured to receive a notification of transmission of a flow of raw data to the second computing unit 200 from the external sensor 12.

In the embodiment described with reference to FIG. 3, the nominal execution and the redundant execution of the computation function are carried out in parallel over time. In this case, the flow of raw data is simultaneously received by the two computing modules executing the same computation function. Alternatively, in the case where the two nominal and redundant executions are carried out sequentially over time, the second computing unit 200 may be configured to temporarily save the flow of raw data with a view to use during the redundant execution of the computation function.

In embodiments of the invention, the first computing unit 100 may further be configured to determine an execution mode of the computation function from among a first execution mode in which the nominal and redundant executions are carried out in parallel over time, and a second execution mode in which the nominal and redundant executions are carried out sequentially over time. The selection of an execution mode by the first computing unit 100 may for example take into account the requirements in terms of latency of the device 20 that sent the computation request.

Figure 4:
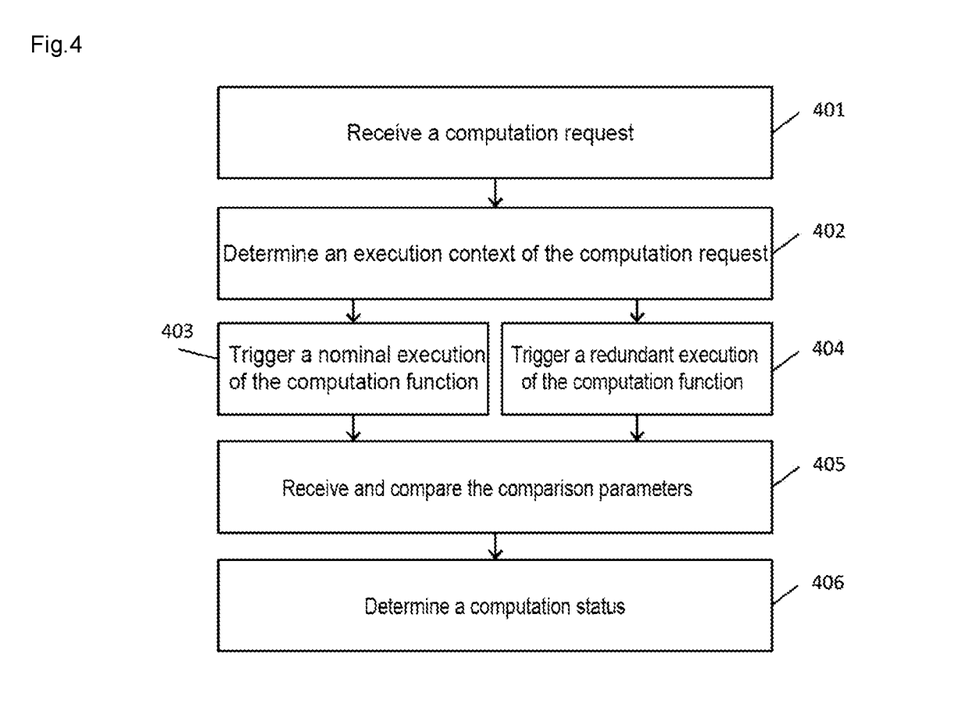
FIG. 4 is a flowchart showing steps implemented in a method for computing driving parameters, according to one embodiment of the invention.

FIG. 4 is a flowchart showing steps of a method for computing driving parameters according to one embodiment of the invention. The computing method may be implemented in a computing device comprising the first computing unit 100 and the second computing unit 200, according to embodiments of the invention.

In step 401, the first computing unit 100 may receive a driving-parameter computation request from an external sending device 20. The received computation request involves execution of a corresponding computation function on the second computing unit 200 in an execution context determined by the first computing unit 100. In embodiments of the invention, processing of a received computation request may further require a flow of raw data delivered by an external sensor 12. Advantageously, step 401 may further comprise a verification of the integrity of the received computation request. Thus, only the computation requests the integrity of which is verified will be processed by the device 10 for computing driving parameters.

In step 402, the first computing unit 100 may determine an execution context of the computation function by determining, for example, all the input parameters required to execute the computation function. Advantageously, step 402 may further comprise determining the execution mode of the computation function, which may be chosen from among a first execution mode, in which the nominal and redundant executions are carried out in parallel over time, and a second execution mode, in which the nominal and redundant executions are carried out sequentially over time. The remainder of the description of FIG. 4 will mainly be given in relation to the first execution mode, by way of illustrative example.

In step 403, the first computing unit 100 may trigger a first execution (nominal execution) of the computation function on the second computing unit 200. The nominal execution of the computation function delivers a first output comprising a first computation result and a first comparison parameter representative of the first computation result. Advantageously, the comparison parameter may be obtained by applying a hash function to the corresponding computation result. Step 403 may further comprise determining a first execution time parameter associated with the first comparison parameter.

In step 404, the first computing unit 100 may trigger a second execution (redundant execution) of the computation function on the second computing unit 200. The redundant execution of the computation function is carried out in the same execution context as the associated nominal execution. Furthermore, the nominal and redundant executions of the computation function are carried out in parallel over time. The redundant execution of the computation function delivers a second output comprising a second computation result and a second comparison parameter representative of the second computation result. Step 404 may further comprise determining a second execution time parameter associated with the second comparison parameter.

In step 405, the first computing unit 100 may receive and compare the first and second comparison parameters. The two comparison parameters may be identical or different. Step 405 may further consist in associating a comparison time parameter with the result of the comparison.

In step 406, the first computing unit 100 may determine a computation status associated with the received computation request, depending on the result of the comparison determined in step 405, and as a function of the execution and comparison time parameters used to validate or invalidate the comparison parameters and the result of the comparison such as detailed above. It is determined that the computation status is positive if no computation error is detected, i.e. if the two comparison parameters are identical and valid and if the computation result is also valid. On the contrary, it is determined that the computation status is negative when a computation error is detected, for example when a parameter or a comparison result is invalid or when the two comparison parameters are not identical.

Advantageously, for a computation request of "request/response" type, the computing method may further comprise an additional step consisting in transmitting, to the device 20 that sent the computation request, the computation result and a notification of a positive computation status.

Figure 5:
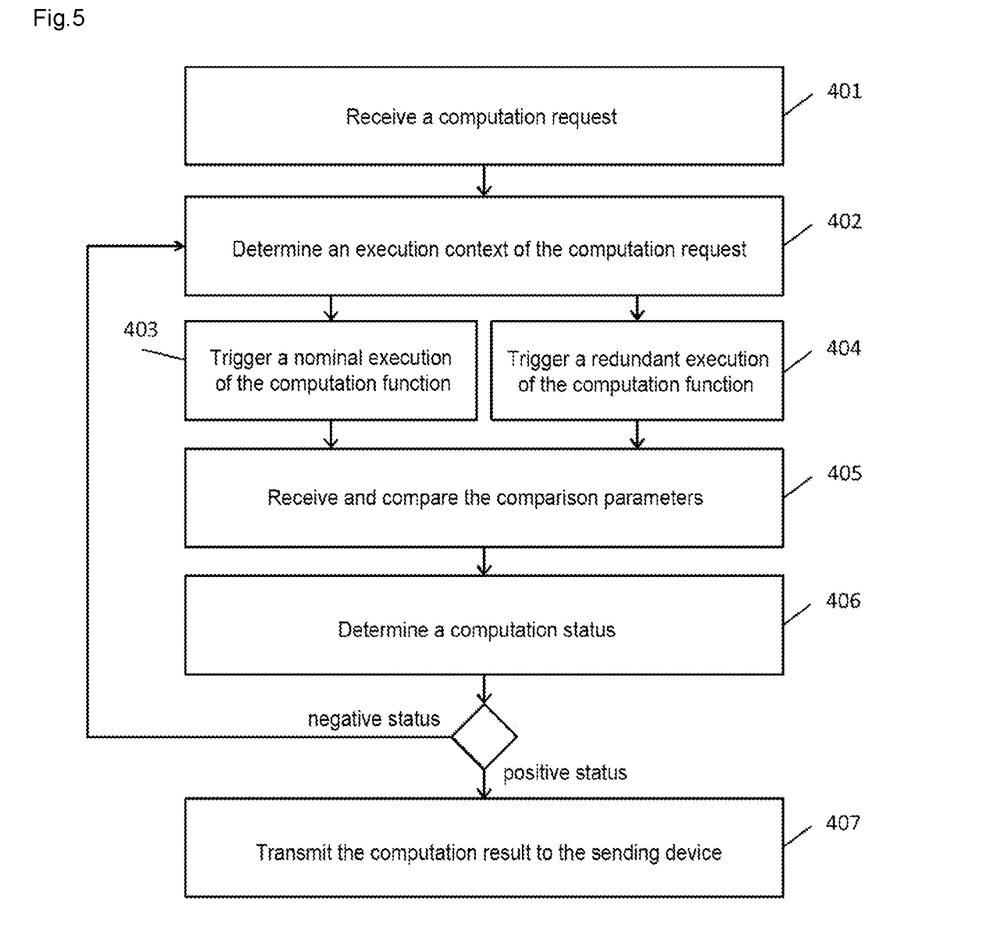
FIG. 5 is a flowchart showing steps implemented in a method for computing driving parameters, according to another embodiment of the invention.

FIG. 5 shows a method for computing driving parameters, according to another embodiment of the invention. The method of FIG. 5 differs from the method of FIG. 4 in that it is iterative, steps 402 to 406 of the method of FIG. 4 being iterated a finite number of times until the computation status is positive. Step 407 of the method of FIG. 5 consists in transmitting, to the device 20 that sent the computation request, the computation result and a notification of a positive computation status.

The embodiments of the invention thus provide a device 10 for computing driving parameters that may be located on board any mobile object such as a vehicle. The computing device allows computation requests requiring a high computing power and a high integrity level compatible with control applications, such as those implemented in autonomous cars, to be processed. Advantageously, a computation request is processed, according to the embodiments of the invention, by executing the corresponding computation function twice on a second computing unit 200 the level of dependability of which is not guaranteed.

Those skilled in the art will understand that the method for computing driving parameters according to the embodiments may be implemented in various ways by hardware, software, or a combination of hardware and software, and especially in the form of program code that may be distributed, in the form of a program product, in various forms. In particular, the program code may be distributed using computer-readable media, which may include computer-readable storage media and communication media. The methods described in this description may in particular be implemented in the form of computer program instructions able to be executed by one or more processors in a computing device. These computer program instructions may also be stored in a computer-readable medium.

The invention is not limited to the embodiments described above by way of non-limiting example. It encompasses all variant embodiments that might be envisaged by those skilled in the art.

The invention claimed is:

1. A device for computing driving parameters that is configured to be located on board a vehicle, the device comprising:
   a first computing unit, associated with a given computing power and a given integrity level; and
   a second computing unit, comprising one or more computers, the second computing unit being associated with a computing power greater than the computing power associated with the first computing unit and with an integrity level lower than the integrity level associated with the first computing unit, the second computing unit being configured to execute one or more computation functions, to deliver, for each computation function, an output comprising a computation result and a comparison parameter representative of said computation result,
   wherein, in response to receipt of a request for computation from a control system of the vehicle for a driving parameter, the computation request corresponding to a given computation function, said first computing unit is configured to:
   determine an execution context of said given computation function on said second computing unit,
   trigger a first execution, called a nominal execution, of said given computation function, in said determined execution context, on said second computing unit, to deliver a first output comprising a first result of computation of said driving parameter and a first comparison parameter, a first execution time parameter being associated with said first comparison parameter,
   trigger a second execution, called a redundant execution, of said given computation function, in said determined execution context, on said second computing unit, to deliver a second output comprising a second result of computation of said driving parameter and a second comparison parameter, a second execution time parameter being associated with said second comparison parameter,
   compare said first comparison parameter and said second comparison parameter, a comparison time parameter being associated with the result of said comparison, and
   determine a computation status of said driving parameter as a function of a condition depending on the result of the comparison and as a function of said time parameters, said computation status being positive when the two comparison parameters are identical and the time parameters are valid, wherein the control system is configured to control the vehicle in response to receipt of the computation result and the computation status being positive.

2. The device as claimed in claim 1, wherein a time parameter is valid when the time parameter is lower than a corresponding threshold.

3. The device as claimed in claim 1, wherein said comparison parameter is obtained from the corresponding computation result by applying a hash function.

4. The device as claimed in claim 1, wherein said nominal execution and said redundant execution are carried out sequentially over time, said second computing unit comprising one or more computers.

5. The device as claimed in claim 4, wherein said nominal execution and said redundant execution are carried out on a same computer said one or more computers of said second computing unit.

6. The device as claimed in claim 1, wherein said nominal execution and said redundant execution are carried out in parallel over time on two separate computers of said second computing unit.

7. The device as claimed in claim 1, wherein said computation request is sent by a sending device and said computing device is further configured to transmit, to said sending device, via said first computing unit, said first result of computation and a notification of a positive computation status, when said computation status is positive.

8. The device as claimed in claim 1, wherein said computation request is sent by a sending device and said computing device is further configured to transmit, to said sending device, via said first computing unit, a computation divergence notification, when said computation status is negative.

9. The device as claimed in claim 1, wherein said first computing unit is configured to implement a plurality of iterations until said computation status is positive.

10. The device as claimed in claim 1, wherein said first computing unit is further configured to verify the integrity of said computation request.

11. The device as claimed in claim 1, wherein said execution context is defined by said first computing unit as a function of a flow of raw data transmitted directly from an external sensor to said second computing unit.

12. The device as claimed in claim 1, wherein said integrity level of said first computing unit is ensured by a hardware redundancy technique.

13. The device as claimed in claim 1, wherein said execution context comprises a plurality of input variables, a plurality of random numbers and time information.

14. The device as claimed in claim 1, wherein the computation request relates to a route for the vehicle to follow and the control system is configured to control the vehicle to follow the route in response to the receipt of the computation result and the computation status being positive.

15. The device as claimed in claim 1, wherein the computation request relates to a driving speed for the vehicle to follow and the control system is configured to control the vehicle to drive at the driving speed in response to the receipt of the computation result and the computation status being positive.

16. The device as claimed in claim 1, wherein the computation request relates to objects in a path of the vehicle and the control system is configured to control the vehicle to avoid the objects in response to the receipt of the computation result and the computation status being positive.

17. A method for computing driving parameters that is configured to be implemented in a computing device located on board a vehicle, the computing device comprising:
    a first computing unit associated with a given computing power and a given integrity level; and
    a second computing unit comprising one or more computers, the second computing unit being associated with a computing power greater than the computing power associated with the first computing unit and with an integrity level lower than the integrity level associated with the first computing unit, the second computing unit being configured to execute one or more computation functions, to deliver, for each computation function, an output comprising a computation result and a comparison parameter representative of said computation result;
the method comprising, in response to receipt of a request for computation from a control system of the vehicle for a driving parameter, the computation request corresponding to a given computation function:
determining an execution context of said given computation function on said second computing unit;
triggering a first execution, called a nominal execution, of said given computation function, in said determined execution context, on said second computing unit, to deliver a first output comprising a first result of computation of said driving parameter and a first comparison parameter, a first execution time parameter being associated with said first comparison parameter;
triggering a second execution, called a redundant execution, of said given computation function, in said determined execution context, on said second computing unit, to deliver a second output comprising a second result of computation of said driving parameter and a second comparison parameter, a second execution time parameter being associated with said second comparison parameter;
comparing said first comparison parameter and said second comparison parameter, a comparison time parameter being associated with the result of said comparison; and
determining a computation status of said driving parameter as a function of a condition depending on the result of the comparison and as a function of said time parameters, said computation status being positive when the two comparison parameters are identical and the time parameters are valid,
wherein the determining the execution context, the triggering the first execution, the triggering the second execution, the comparing, and the determining the computation status are implemented by said first computing unit, and
wherein the control system is configured to control the vehicle in response to receipt of the computation result and the computation status being positive.

* * * * *